(12) United States Patent
Jones

(10) Patent No.: US 8,341,165 B2
(45) Date of Patent: Dec. 25, 2012

(54) METHOD AND APPARATUS FOR SEARCHING EXTENSIBLE MARKUP LANGUAGE (XML) DATA

(75) Inventor: Kevin J. Jones, Harrogate (GB)

(73) Assignee: Intel Corporation, Santa Clara, CA (US)

( * ) Notice: Subject to any disclaimer, the term of this patent is extended or adjusted under 35 U.S.C. 154(b) by 913 days.

(21) Appl. No.: 11/949,761

(22) Filed: Dec. 3, 2007

(65) Prior Publication Data

US 2009/0144521 A1 Jun. 4, 2009

(51) Int. Cl.
*G06F 17/30* (2006.01)

(52) U.S. Cl. ................................................ 707/756

(58) Field of Classification Search ............ 707/758, 707/736, 741, 750, 999.001, 999.003, 756
See application file for complete search history.

(56) References Cited

U.S. PATENT DOCUMENTS

| | | | |
|---|---|---|---|
| 5,819,101 A | 10/1998 | Peleg et al. | |
| 7,197,625 B1 | 3/2007 | van Hook et al. | |
| 2002/0002671 A1* | 1/2002 | Symes | 712/300 |
| 2003/0131217 A1* | 7/2003 | Henry et al. | 712/221 |
| 2004/0006741 A1 | 1/2004 | Radja et al. | |
| 2004/0010754 A1 | 1/2004 | Jones | |
| 2005/0049996 A1 | 3/2005 | Srinivasan et al. | |
| 2005/0132342 A1 | 6/2005 | Van Lunteren | |
| 2006/0167869 A1 | 7/2006 | Jones | |
| 2006/0167907 A1 | 7/2006 | Jones | |
| 2006/0284745 A1 | 12/2006 | Cameron | |
| 2007/0083807 A1 | 4/2007 | Shaudys et al. | |
| 2007/0182978 A1* | 8/2007 | Nakamura et al. | 358/1.13 |

FOREIGN PATENT DOCUMENTS

| | | |
|---|---|---|
| CN | 101452482 | 6/2009 |
| EP | 2068254 | 6/2009 |
| JP | 10-512070 | 11/1998 |
| JP | 2004-295674 | 10/2004 |
| JP | 2005-135199 | 5/2005 |
| NO | 08253836 | 6/2009 |

OTHER PUBLICATIONS

Thijs!bot, "SIMD" Nov. 27, 2006, Wikipedia.org, p. 1-4.*
Wikipedia, "Intel P5 (microarchitecture)" Nov. 27, 2006, Wikipedia.org, p. 1-3.*
Lempinen, Eero, et al., "DEL—Data Extraction Language" Oct. 31, 2001, W3C <http://www.w3.org/TR/data-extraction>, p. 1-29.*
European Search Report, European Patent Application 08253836.4 mailed Apr. 6, 2009.
W3C, "Extensible Markup Language (XML)", 1.0 (Fourth Edition), W3C Recommendation, Aug. 16, 2006, edited in place Sep. 29, 2006, 63 pages, http://www.w3.org/TR/2006/REC-xml-20060816/.

(Continued)

*Primary Examiner* — Etienne Leroux
(74) *Attorney, Agent, or Firm* — Blakely, Sokoloff, Taylor & Zafman LLP

(57) ABSTRACT

Extensible Markup Language (XML) data is represented as a list of structures with each structure in the list representing an aspect of the XML. A set of frequently used elements is extracted from the list of structure representation and stored in packed vectors. The packed vector representation allows Single Instruction Multiple Data (SIMD) instructions to be used directly on the XML data to increase the speed at which the XML data may be searched while minimizing the memory needed to store the XML data.

18 Claims, 8 Drawing Sheets

OTHER PUBLICATIONS

Office Action from European Patent Application No. 08253836.4, dated Aug. 19, 2009, 7 pgs.
Office Action from Chinese Patent Application No. 200810183338.X dated Jul. 8, 2010, 8 pgs.
Second Office Action for Chinese Patent Application No. 200810183338.X, Mailed Mar. 9, 2011, 11 pages.
First Office Action for Japanese Patent Application No. 2008-307456, Mailed Apr. 6, 2011, 9 pages.
Ohnuki, Hiroyuki, "Introduction to Assembler for Development Engineers Who Wish to Master at Least x86CPU, No. 22, SIMD Instructions, (1) MMX Instructions,"Interface, Japan, CQ Publishing Co., Ltd. Dec. 1, 2003, vol. 29, Issue 12, pp. 153-165.
Yuhei, Akamine, et al., "The Fast CA Simulator Using MMX Technology", Journal of Japanese Society for Artifical Intelligence, Japan, The Japanese Society for Artificial Intelligence, Nov. 1, 2001, vol. 16, pp. 74-84.

* cited by examiner

— 302

| DP[0] P0 | DP[1] 0 | DP[2] 0 | DP[3] T3 | DP[4] P4 | DP[5] N4 | DP[6] 0 | DP[7] 0 |
|---|---|---|---|---|---|---|---|
| DP[8] T2 | DP[9] 0 | DP[10] 0 | DP[11] T3 | DP[12] P4 | DP[13] N4 | DP[14] 0 | DP[15] 0 |
| DP[16] 0 | DP[17] T5 | DP[18] P6 | DP[19] N7 | DP[20] 0 | DP[21] P7 | DP[22] N7 | DP[23] 0 |

FIG. 3B

| B[0] SE | B[1] NS | B[2] A | B[3] T | B[4] SE | B[5] T | B[6] SE | B[7] SE | } 304 |
|---|---|---|---|---|---|---|---|---|
| B[8] a | B[9] ns1 | B[10] a1 | B[11] | B[12] b | B[13] | B[14] c | B[15] c | |
| DP[0] P0 | DP[1] 0 | DP[2] 0 | DP[3] T3 | DP[4] P4 | DP[5] N4 | DP[6] 0 | DP[7] 0 | } 306 |
| DP[8] T2 | DP[9] 0 | DP[10] 0 | DP[11] T3 | DP[12] P4 | DP[13] N4 | DP[14] 0 | DP[15] 0 | |
| DP[16] 0 | DP[17] T5 | DP[18] P6 | DP[19] N7 | DP[20] 0 | DP[21] P7 | DP[22] N7 | DP[23] 0 | |
| B[16] T | B[17] SE | B[18] EE | B[19] T | B[20] EE | B[21] T | B[22] EE | B[23] | } 308 |
| B[22] | B[25] d | B[26] d | B[27] | B[28] b | B[29] | B[30] a | B[31] | |
| DP[24] 0 | DP[25] 0 | DP[26] T8 | DP[27] P9 | DP[28] N9 | DP[29] 0 | DP[30] P10 | DP[31] N10 | } 310 |
| DP[32] 0 | DP[33] 0 | DP[34] 0 | DP[35] T11 | DP[36] P12 | DP[37] N12 | DP[38] 0 | DP[39] 0 | |
| DP[40] 0 | DP[41] T13 | DP[42] P13 | DP[43] N14 | DP[44] 0 | DP[45] - | DP[46] - | DP[47] - | |

FIG. 3C

METHOD AND APPARATUS FOR SEARCHING EXTENSIBLE MARKUP LANGUAGE (XML) DATA

FIELD

This disclosure relates to Extensible Markup Language (XML) in particular to improving the speed at which an XML document is searched.

BACKGROUND

XML is an open standard general-purpose markup language used to encode documents to facilitate the sharing of data via the Internet. XML is similar to HTML used to create documents on the World Wide Web incorporating text, graphics, sound, video, and hyperlinks. However, XML differs from HTML by employing tags that indicate the logical structure instead of the display specifications of the coded data.

There are many different ways to represent XML data in memory structures. For example, XML data may be represented as (1) character sequences as recommended by the World Wide Web Consortium (W3C); (2) character sequences with secondary indexes to improve access speed; (3) a list of structures, each structure representing some aspect of the XML data or (4) trees of structures, each structure representing some aspect of the XML data.

A typical 'list of structures' representation of XML data uses structure types to represent different features of XML data and connects these structures into a list in document order. Typical structure types are elements, attributes, character data, namespaces, processing-instructions and comments.

The 'list of structures' representation of XML data has the advantage of being relatively compact compared to a 'trees of structures' representation and is also easier to automatically process than character sequences. Thus, it is a good compromise between slow character sequence processing and a 'trees of structures' representation which may require a large memory.

A search of an XML document may be logically specified using the hierarchy exposed by the XML data, for example, find the children of a node 'b' which is the child of a node 'a' is expressed in the World Wide Web Consortium (W3C) XML Path Language (XPath) syntax as "//a/b/*" in a way similar to the use of regular expressions with character sequences. However, the use of a hierarchical search model over data that is stored as a list of structures may be slow in comparison to searching data that is represented as a "tree of structures" where pointers between the structures may be used to limit the search space. Thus, a 'tree of structures' representation provides for random access to the XML data whereas a 'list of structures' only provides for sequential access.

BRIEF DESCRIPTION OF THE DRAWINGS

Features of embodiments of the claimed subject matter will become apparent as the following detailed description proceeds, and upon reference to the drawings, in which like numerals depict like parts, and in which:

FIG. 3B illustrates an embodiment of a secondary list extracted from the list of structures shown in FIG. 1B;

FIG. 3C illustrates an embodiment of a structure extracted from the list of structures shown in FIG. 1B with primary and secondary lists interleaved;

Although the following Detailed Description will proceed with reference being made to illustrative embodiments of the claimed subject matter, many alternatives, modifications, and variations thereof will be apparent to those skilled in the art. Accordingly, it is intended that the claimed subject matter be viewed broadly, and be defined only as set forth in the accompanying claims.

DETAILED DESCRIPTION

Figure 1A:
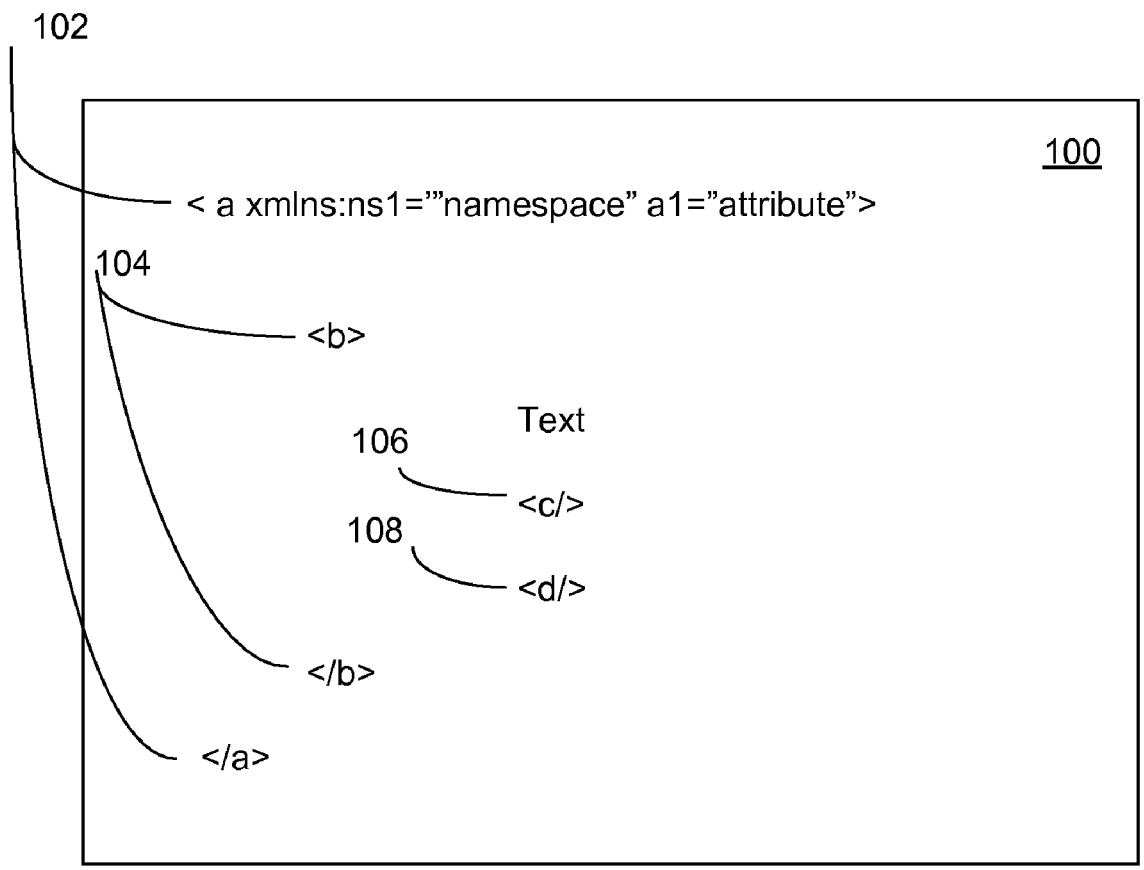
FIGS. 1A and 1B illustrate an example of an XML document.
Figure 1B:
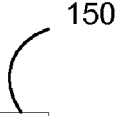

FIGS. 1A and 1B illustrate an example of an XML document. The XML document may be formatted as described in the World Wide Web Consortium (W3C) Extensible Markup Language (XML) 1.0 available at www.w3.org. As shown in FIG. 1A, the XML document 100 includes a plurality of elements 102, 104, 106, 108, with elements having a start tag '< >' and/or an end tag '</>'. The type of the element 102, 104, 106, 108, for example, 'a, b, c or d' is included in both the start tag and end tag.

Referring to FIG. 1A, element 102 includes a namespace declared using "xmlns" having a name (ns1) and a Uniform Resource Identifier (uri) (namespace), that is, a compact sequence of characters that identifies an abstract or physical resource. Element 102 also includes an attribute having a name (a1) and a value (attribute). The FIG. 1B illustrates a list of structures 150 that may be used to represent the XML document 100 shown in FIG. 1A. A typical 'list of structures' representation of XML data uses different structure types to represent different features of XML data and connects these structures into a list in document order. Typical structure types are elements for example, start element, end element, attributes, namespaces, processing-instructions, comments and character data, for example, text.

As shown in FIG. 1B, the list of structures 150 to represent the XML document 100 shown in FIG. 1A includes element types a, b, c and d, namespace, attribute and text that are represented by structures 152-1, . . . , 150-15 including start and end element structures, namespace structures, attribute structures and text structures.

Thus, element type 'a' 102 (FIG. 1A), that is, <a xmlns: ns1="namespace" a1="attribute"> </a> is represented by a start element structure 152-1, a namespace structure 152-2, an attribute structure 152-3, a text structure 152-4 and an end element structure 152-15. Structure 152_1 corresponds to <a>, structure 152-2 corresponds to xmlns: ns1="namespace"; structure 152-3 corresponds to 'a1="attribute"; structure 152-3 corresponds to the newline and tab and structure 152-15 corresponds to "</a>" in the XML document 100 shown in FIG. 1A.

In order to reduce the performance difference between searching a "tree of structures" representation of an XML document and a "list of structures" representation of the XML document, the structures in the "tree of structures" may be enhanced with offsets or pointers which provide direct links between the structures or by moving infrequently accessed data to secondary storage mechanisms to reduce the amount of memory read. Hierarchical searches may also be evaluated together so that the access cost is amortized over a number of searches. However, even if these techniques are used, the performance of searches is still limited by the time it takes to scan through all of the data in the XML document to find a particular type of element.

As the length (number of bits) in each structure in the list of structures is variable, a search for a particular element type requires a sequential search through the XML document byte by byte to find a match. An XML document may have thousands of records, thus, a scan from start to end of an XML document for a particular record is very time consuming.

The scanning speed of the 'list of structures' representation is improved to aid the searching process by storing the XML data in a format suitable for Single Instruction Multiple Data (SIMD) instructions according to the principles of the present invention. A SIMD instruction may be used to perform a search of a plurality of structure elements in parallel.

A Single Instruction Multiple Data (SIMD) instruction performs the same operation simultaneously on multiple elements in a dataset. In order to allow a single SIMD instruction to inspect a number of structures, the elements of the dataset are typically stored in a "packed vector", that is, a data structure that includes a plurality of elements of the same size. Instead of loading data from each structure on a byte by byte basis, the XML data is stored in a format suitable for use by SIMD instructions.

In an embodiment, a set of structures are arranged in parallel form so that the data is readily accessible to a SIMD instruction. The list of structures shown in FIG. 1B for the XML document shown in FIG. 1A is logically split into two parts: (1) a primary list that groups key information in a parallel layout; and (2) a secondary list of the residual data in standard serial form.

Figure 2:
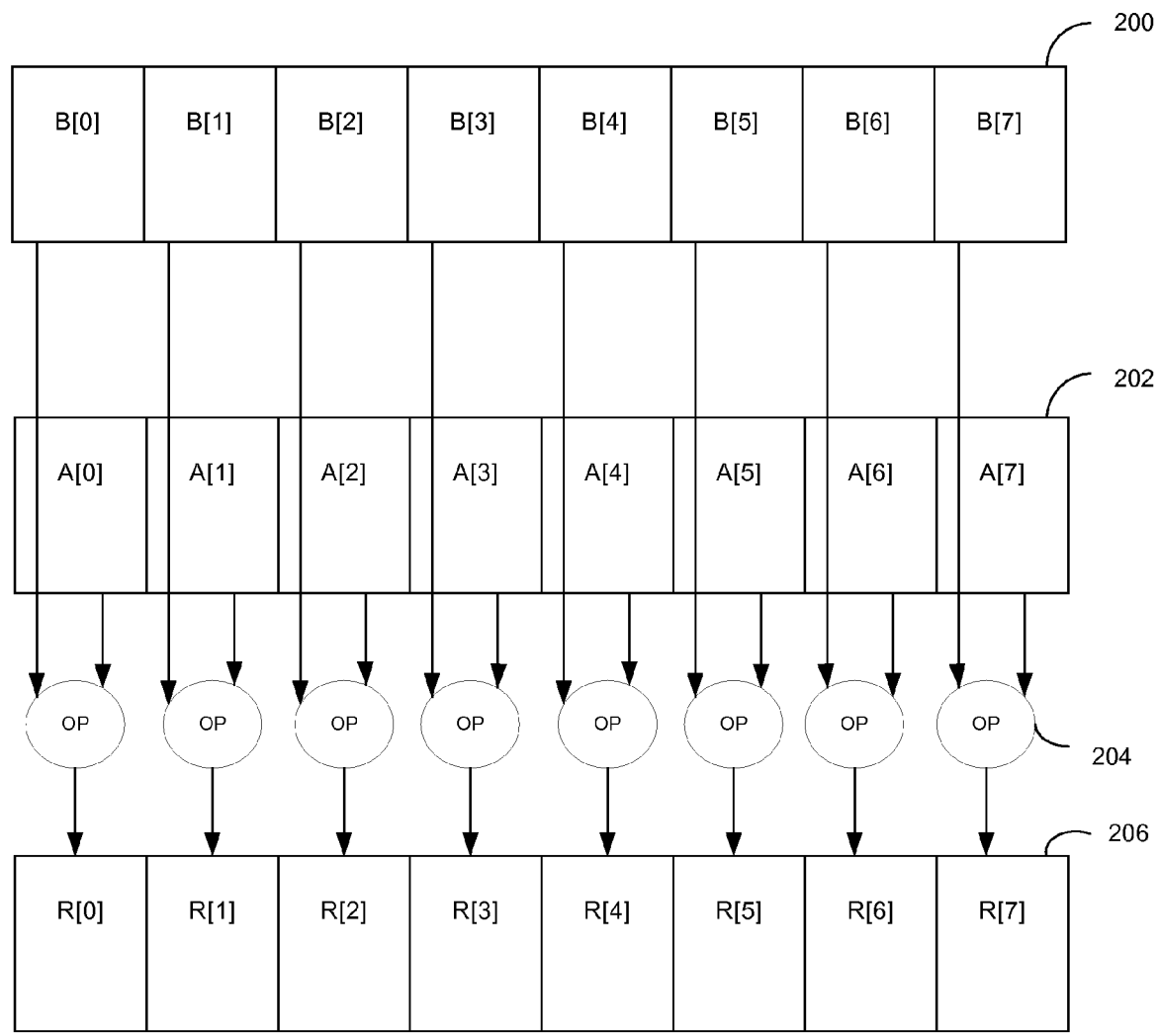
FIG. 2 is a block diagram of a SIMD instruction execution model.

FIG. 2 is a block diagram of a SIMD instruction execution model. A SIMD instruction works by operating on multiple pieces of data at the same time using one instruction. As shown in FIG. 2, a first operand 200 has eight bytes labeled B[0]-B[7] and a second operand 202 having eight bytes labeled A[0]-A[7]. A same operation 'op' 204 is performed in parallel on one byte of the first operand 200 and a corresponding byte 300 in the second operand to produce a result having eight bytes labeled R[0]-R[7].

FIG. 2 illustrates an embodiment of a primary list 300 extracted from the list of structures 150 shown in FIG. 1B according to the principles of the present invention. A set of structure types and a set of structure names are stored in contiguous memory based on the length of a SIMD instruction. This allows a SIMD instruction to be used to search the set of structure types and/or the set of structure names in the primary list 300 in parallel as discussed in conjunction with the model shown in FIG. 2.

Figure 3A:
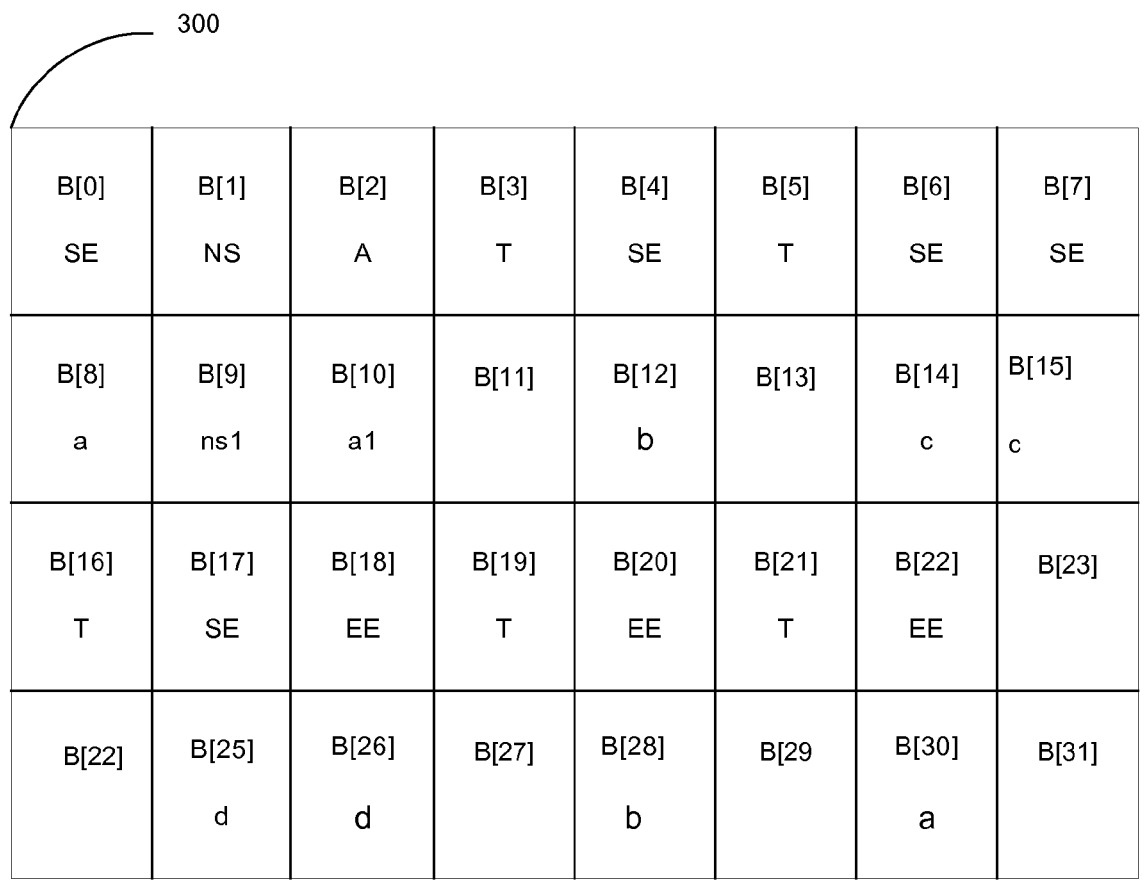
FIG. 3A illustrates an embodiment of a primary list extracted from the list of structures shown in FIG. 1B according to the principles of the present invention.

FIG. 3 illustrates the layout of the primary list 200 assuming each set has eight entries for use by a SIMD instruction that operates on 64-bits (8 bytes) in parallel. In other embodiments there may be more or less than eight entries per set. In the embodiment shown, the primary list 300 has 32 bytes labeled B[0] through B[31] to store structure names and types extracted from the list of structures representation 150.

The primary list 300 may be extracted from the XML document 100 that is represented as a list of structures 150 in response to an Application Programming Interface (API) request to perform a search in the XML document. A list to packed vector converter may be used to extract elements from the list of structures representation 150 to produce the packed vector representation in the primary list 300.

Each element from the list of structures representation 150 that is stored in the primary list 300 is either a type or a name of a structure. In the embodiment shown, the operand size used by a SIMD instruction is 64 bits (that is, 8 bytes). Thus, 32 (4×8 bytes) contiguous bytes of memory are allocated for the primary list 300 to store all of the structure types and structure names corresponding to the 15 structures shown in the list of structures representation 150 in FIG. 1B.

The first eight bytes [B0-B7] (a set of eight parallel entries) store the structure types corresponding to the first eight structures 152-1, . . . , 152-8 in the list of structures representation 150 shown in FIG. 1B. The next eight bytes [B8-B15] store the structure names corresponding to the first eight structures 152-1, . . . , 152-8 in the list of structures representation 150 shown in FIG. 1B. Bytes B[16] through B[23] store the structure types corresponding to structures 152_9, . . . 152_15 in the list of structures representation 150 shown in FIG. 1B and bytes B[24] through B[31] store the store the structure types corresponding to structures 152_9, . . . 152_15 in the list of structures representation 150 shown in FIG. 1B.

The structure types stored in bytes B[0]-B[7] and bytes B[16]-B[23] include a start element (SE) type structure, an end element (EE) type structure, a namespace (NS) type structure, an attribute (A) type structure, and a Text (T) type structure. The structure names include a-b, ns1, and a1.

The structure type and structure names are the most common fields in the XML document 100 to be searched. The key data items in the primary list 300 are the structure type stored in bytes B[0]-B[7] and bytes B[16]-B[23] and optionally the structure names stored in bytes B[8]-B[15] and bytes B[23]-B[31]. For the structure name, the representation allows the substitution of a string of characters by a number representing that string as is common in XML data representations. Also, as shown, each structure type and structure name may be encoded in a byte.

The primary list 300 may be searched for specific structure type and/or structure name using SIMD instructions. For example, two SIMD equality comparisons that operate on the bytes B[0]-B[7] & B[16]-B[23] of the primary list 300 may be used to search the XML document 100 for a specific type of structure.

Thus, the packed vector representation in the primary list 300 shown in FIG. 3, logically reduces the scanning cost by 8 by searching 8 bytes in parallel. More complex searches may be performed by combining SIMD equality operations with the bytes ranges B[0]-B[7] & B[24]-B[31].

While all data in the list of structures representation 150 may be arranged in the primary list 300, there are infrequently used items which may increase the time to search the primary list 200 for a particular structure name or type. Thus, in an embodiment, infrequently used elements in the list of structures representation 150, for example, uri and attribute values are not included in the primary list 300. Instead of searching sequentially through the list of structures representation 150, the XML document is stored in the primary list of packed vectors 300 and a secondary list.

FIG. 3B illustrates an embodiment of a secondary list 302 extracted from the list of structures 150 shown in FIG. 1B.

The secondary list 302 arranged in a more conventional serial way is used in addition to the primary list to search the infrequently used items, if the search in the primary list 300 does not result in a match. The secondary list 302 stores pointers to data (DP). In the example shown in FIG. 3B, 23 pointers (DP[0]-DP[23]) are shown. Each pointer (DP) may have 4 or 8 bytes dependent on whether a CPU in the system is 32-bits (4 byte) or 64-bits (8-byte). Each entry (B[0]-B[31]) in the primary list 300 is associated with three entries (DP) in the secondary list (stream) 302. These three entries store pointers to the additional information required to describe the infrequently accessed XML data that is not stored in the primary list 300.

The first entry is for storing a pointer to a prefix string for the record (structure) 152-1, . . . , 152-15, the second entry is for storing a pointer to a name string or a pointer to a URI string and the third entry is for storing a pointer to a text string. As not all structure types use all three entries, unused entries are shown as 0 in the secondary list 302 shown in FIG. 3B.

In the example shown in FIG. 3B, Pn represents a pointer to a prefix string for record 'n', Nn represents a pointer to a name string for 'n', Un represents a pointer to a URI string for 'n' and Tn represents a pointer to a text string for record 'n'. These fields are stored as prefix, name/URI and text, that is, in three entries. The name and URI share the second entry because no structure type requires both name and URI.

An offset into the secondary list 302 may be calculated for a specific structure 152_1, . . . , 152_15 by multiplying the position of the structure in the primary list 300 by 3 times the size of entries in the secondary list 302, for example, 4 or 8.

In another embodiment, the primary and secondary lists may be interleaved into one structure and/or the parallel data representation may be used selectively for some parts of the input but not others. In either case the principle of parallel data layout of XML data for improving search efficiency still applies.

To interleave the primary and secondary streams first a fixed number of structures are encoded in primary stream format and stored in memory. Next, the same fixed number of structures is encoded in secondary stream format and stored in the next consecutive memory locations in the memory. This process is repeated as many times as is needed to encode all of the data. FIG. 3C illustrates an embodiment of a structure 310 extracted from the list of structures 150 shown in FIG. 1B with primary and secondary lists interleaved. As shown in FIG. 3C, the primary list is stored at 304 and 308 and the secondary list is stored at 306 and 308.

Figure 4:
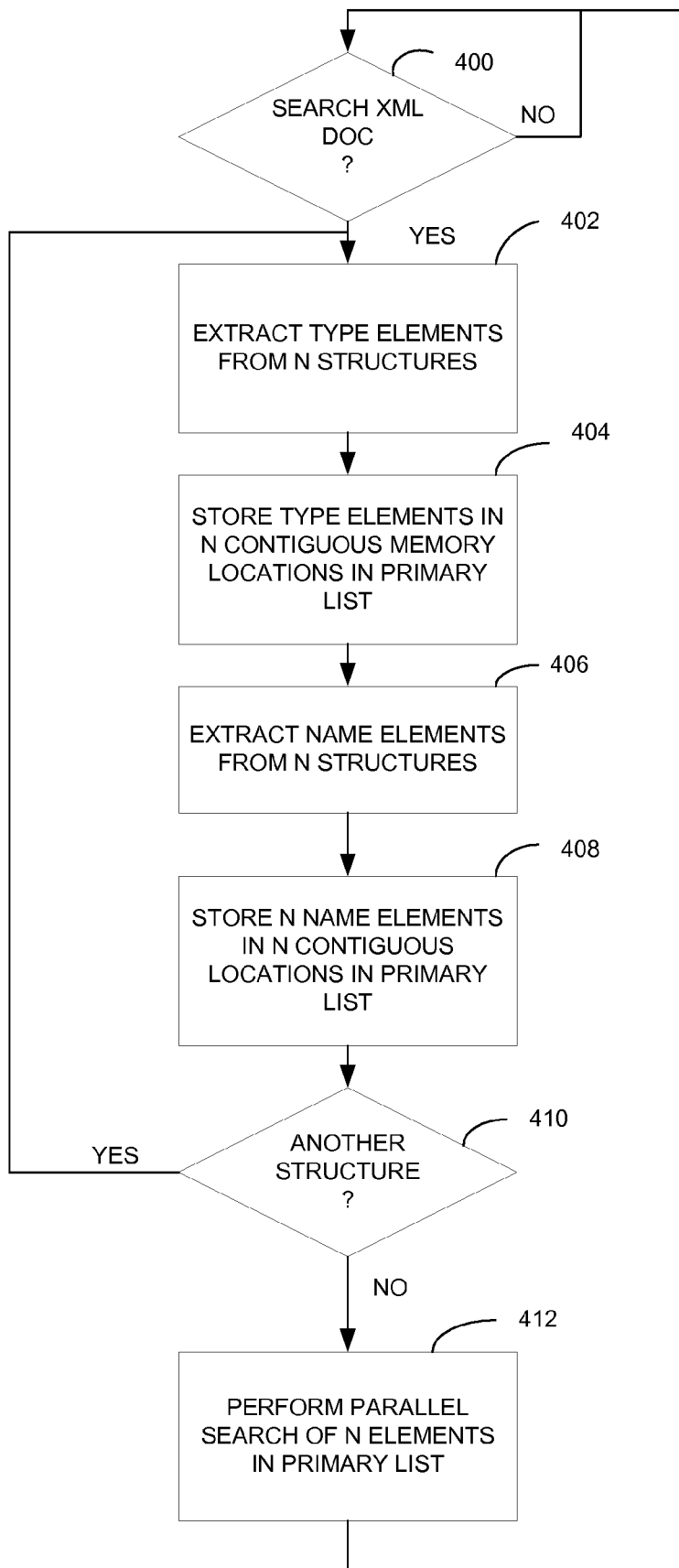
FIG. 4 is a flowchart illustrating an embodiment of a method for generating the primary list shown in FIG. 3 from the list of structures shown in FIG. 1B.

FIG. 4 is a flowchart illustrating an embodiment of a method for generating the primary list 400 shown in FIG. 2 from the list of structures representation 150 shown in FIG. 1B.

At block 400, the list to packed vector converter waits to receive a request to process an XML document 100. The request to process the XML document may result from an API call to process an XML document. JAXP is an example of an API call that is used for processing XML documents in JAVA. If a request is received, processing continues with block 402. If not, processing continues with block 402.

At block 402, the XML document 100 that has been stored as a list of structures representation 150 as shown in FIG. 1B is parsed to extract the structure type from N consecutive structures. For example, referring to FIG. 1B, if N is eight, the structure type is extracted from the first eight structures 152_1, . . . 152__8 in the list of structures representation with the first structure type being start element (SE) type and the eighth structure type being end element (EE). Processing continues with block 404.

At block 404, as the N structure types are extracted from the list of structures representation, the structure types are stored in contiguous memory locations in a primary list 300. Processing continues with block 406.

At block 406, after the structure type has been extracted from each of the N elements, the list of structures representation 150 is parsed for N structure names, one per structure corresponding to the N structures from which the structure type was extracted. Processing continues with block 408.

At block 408, as the structure names are extracted from the list of structures representation, the structure names are stored in contiguous memory locations in the primary list 200, starting with the memory location after the Nth structure type has been stored. One location is reserved for storing the structure type for each of the N structures irrespective of whether there is a structure name associated with the structure. For example, as shown in FIG. 4, byte B[11] is reserved for storing the structure name associated with structure 152_4, even though, structure 152_4 does not have a structure name. Processing continues with block 410.

At block 410, the list to packed vector converter determines if there is another structure in the list of structures representation 150 to be processed. If so, processing continues with block 402, to process the remaining structure(s) in the list of structures representation 150. If not, processing continues with block 412.

At block 412, after the primary list 300 has been generated from the list of structures representation 150, the primary list 400 may be searched for specific structure types and/or structure names. Eight bytes in a packed vector in the primary list may be compared in parallel with a byte to search for a match using a SIMD instruction. For example, an x86 MMX comparison instruction such as a compare packed bytes for equal (PCMPEQB) instruction performs a compare for equality of packed bytes in a destination operand and a source operand. Processing continues with block 400 to wait for another request.

Figure 5:
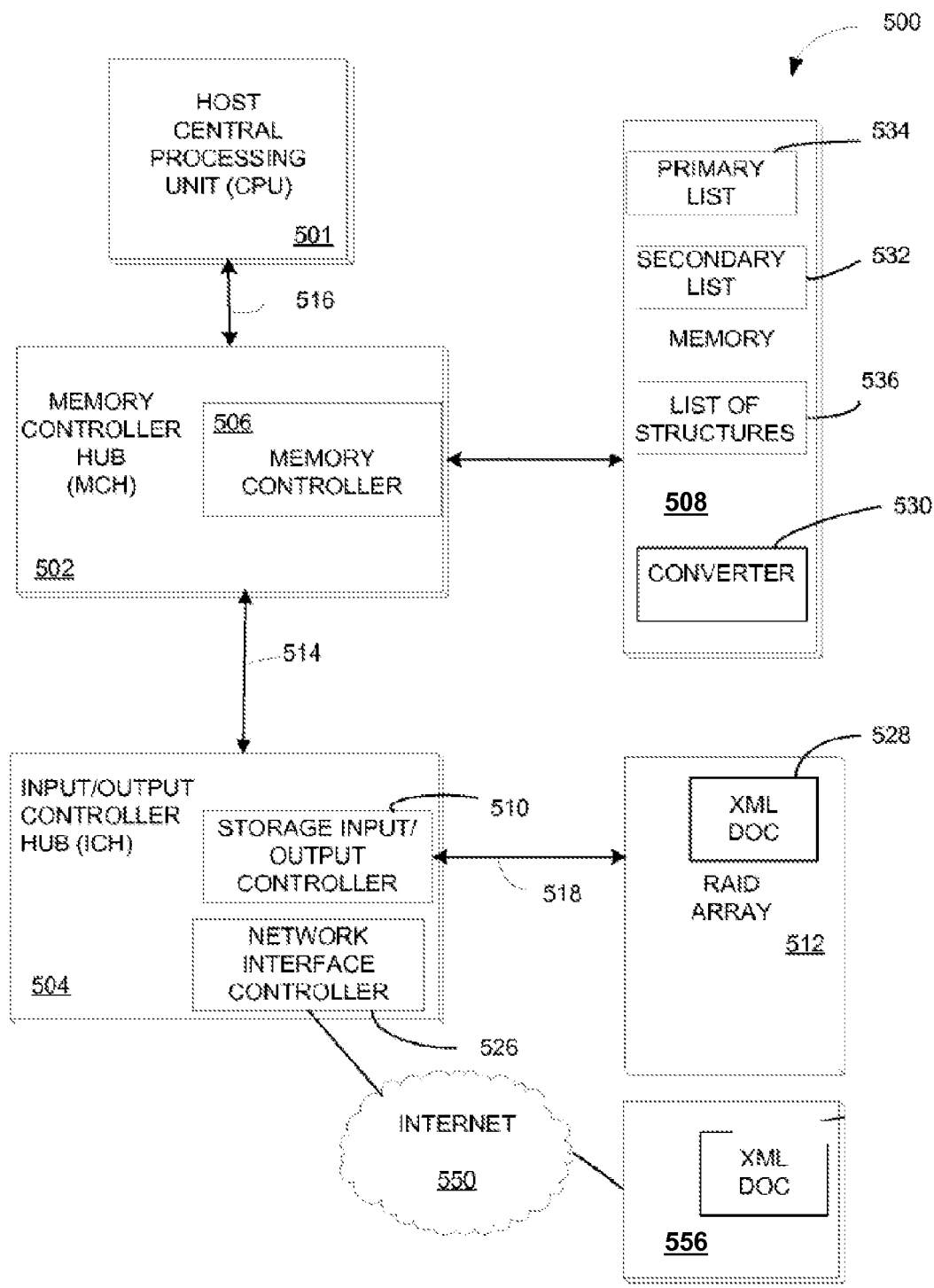
FIG. 5 is a block diagram of a system that includes an embodiment of a list to packed vector converter for generating the primary list from the list of structures representation of an XML document.

FIG. 5 is a block diagram of a system that includes an embodiment of a list to packed vector converter 540 for generating a primary list 542 from a list of structures representation of an XML document 528.

The system 500 includes a processor 501, a Memory Controller Hub (MCH) 502 and an Input/Output (I/O) Controller Hub (ICH) 504. The MCH 502 includes a memory controller 506 that controls communication between the processor 501 and memory 504. The processor 501 and MCH 502 communicate over a system bus 516.

The processor 501 may be any one of a plurality of processors that support Streaming SIMD Extensions (SSE) instructions such as a single core Intel® Pentium IV® processor, a single core Intel Celeron processor, an Intel® XScale processor or a multi-core processor such as Intel® Pentium D, Intel® Xeon® processor, or Intel® Core® Duo processor or any other type of processor.

The memory 503 may be Dynamic Random Access Memory (DRAM), Static Random Access Memory (SRAM), Synchronized Dynamic Random Access Memory (SDRAM), Double Data Rate 2 (DDR2) RAM or Rambus Dynamic Random Access Memory (RDRAM) or any other type of memory.

The ICH 504 may be coupled to the MCH 502 using a high speed chip-to-chip interconnect 514 such as Direct Media Interface (DMI). DMI supports 2 Gigabit/second concurrent transfer rates via two unidirectional lanes.

The ICH 504 may include a storage Input/Output (I/O) controller 510 for controlling communication with at least one storage device 512 coupled to the ICH 504. The storage device may be, for example, a disk drive, Digital Video Disk (DVD) drive, Compact Disk (CD) drive, Redundant Array of Independent Disks (RAID), tape drive or other storage device. The ICH 504 may communicate with the storage device 512 over a storage protocol interconnect 518 using a serial storage protocol such as, Serial Attached Small Computer System Interface (SAS) or Serial Advanced Technology Attachment (SATA).

The ICH 504 may also include a Network Interface Communications (NIC) controller 526 for controlling communications over the Internet 550 with at least one other system 556. The memory 508 may store a list to packed vector converter 530 for for generating a primary list 532 from a list of structures representation of an XML document 528. The XML document 528 may be stored in the RAID array 512 or in another system 528 accessible via the Internet 550. The packed vector converter 530 operates on a list of structures representation 536 of the XML document 528 that may be stored in memory 508. The packed vector converter 530 generates a primary list 534 and a secondary list 532 from the list of structures representation of the XML document 528 according to the principles of the present invention.

An embodiment of the invention has been described for a 64-bit SIMD instruction that is, a SIMD instruction that operates on 64-bits (8 bytes) in parallel. However, the invention is not limited to operating on 64-bits in parallel. An embodiment o the invention may use a SIMD instruction that operates on more than 64-bits in parallel, for example, using 128-bit registers to operate on 16 bytes in parallel.

It will be apparent to those of ordinary skill in the art that methods involved in embodiments of the present invention may be embodied in a computer program product that includes a computer usable medium. For example, such a computer usable medium may consist of a read only memory device, such as a Compact Disk Read Only Memory (CD ROM) disk or conventional ROM devices, or a computer diskette, having a computer readable program code stored thereon.

While embodiments of the invention have been particularly shown and described with references to embodiments thereof, it will be understood by those skilled in the art that various changes in form and details may be made therein without departing from the scope of embodiments of the invention encompassed by the appended claims.

The invention claimed is:

1. A method comprising:
   extracting a set of elements from a list of structures representation of an Extensible Markup Language (XML) document, the set of elements comprises at least one of name elements and type elements;
   storing the name elements and the type elements in a primary list that has a parallel layout, wherein the name elements are to be stored in a packed vector in a first set of contiguous memory locations and the type elements are to be stored in the packed vector in a second set of contiguous memory locations; and
   storing in a secondary list pointers to information to describe the XML document that is not stored in the primary list.

2. The method of claim 1, wherein each element in the primary list is associated with three pointers in the secondary list.

3. The method of claim 1, wherein the information to describe the XML document pointers that is not stored in the primary list comprises infrequently used elements in the list of structures.

4. The method of claim 1, wherein the number of elements in the set is at least eight.

5. The method of claim 1, further comprising:
   performing a search of the first and second packed vectors using a Single Instruction Multiple Data (SIMD) instruction to search in parallel for a match in each element in the set of elements in the packed vectors.

6. The method of claim 5, wherein the SIMD instruction operates on eight bytes in parallel.

7. The method of claim 5, wherein the SIMD instruction operates on sixteen bytes in parallel.

8. The method of claim 1,
   wherein the secondary list comprises variable sized elements.

9. An apparatus comprising:
   a list to packed vector converter to extract a set of type and name elements from a list of structures representation of an Extensible Markup Language (XML) document; and
   a primary list to store type elements in a packed vector in a first set of contiguous memory locations and to store name elements in the packed vector in a second set of contiguous memory locations to produce a parallel data representation;
   a memory to store the primary list.

10. The apparatus of claim 9, wherein the number of elements in the set is at least eight.

11. The apparatus of claim 9, wherein the primary list has a parallel layout for use by a Single Instruction Multiple Data (SIMD) instruction to search in parallel for a match in each element in the set of elements in the packed vector in parallel.

12. The apparatus of claim 11, wherein the SIMD instruction operates on eight bytes in parallel.

13. The apparatus of claim 11, wherein the SIMD instruction operates on sixteen bytes in parallel.

14. The apparatus of claim 9, further comprising:
   a secondary list to store variable sized elements extracted from the list of structures representation not included in the primary list to allow a search for variable sized elements.

15. An article including a machine-accessible medium having associated information, wherein the information, when accessed, results in a machine performing:
   extracting a set of elements from a list of structures representation of an XML document, the set of elements comprises at least one of name elements and type elements; and
   storing the name elements in a packed vector in a first set of contiguous memory locations and the type elements in the packed vector in a second set of contiguous memory locations to produce a parallel packed vector representation.

16. The article of claim 15, wherein further comprising:
   storing a secondary list of variable sized elements extracted from the list of structures representation not included in the packed vector for a search for variable sized elements.

17. The article of claim 16, further comprising:
   interleaving the elements in the packed vector and variable sized elements in the secondary list.

18. The article of claim 15, wherein the machine further performing:
   a search of the packed vector using a Single Instruction Multiple Data (SIMD) instruction to search in parallel for a match in the set of elements in the packed vector.

* * * * *